United States Patent
Jung et al.

(10) Patent No.: US 9,519,098 B2
(45) Date of Patent: Dec. 13, 2016

(54) BACKLIGHT UNIT AND LIQUID CRYSTAL DISPLAY INCLUDING THE SAME

(71) Applicant: LG Display Co., Ltd., Seoul (KR)

(72) Inventors: YeounJei Jung, Daegu (KR); SeHwan Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/540,791

(22) Filed: Nov. 13, 2014

(65) Prior Publication Data

US 2015/0173198 A1  Jun. 18, 2015

(30) Foreign Application Priority Data

Dec. 16, 2013 (KR) ........................ 10-2013-0156704

(51) Int. Cl.
 *H05K 1/18* (2006.01)
 *F21V 8/00* (2006.01)
 *G02F 1/1335* (2006.01)

(52) U.S. Cl.
 CPC ....... *G02B 6/0073* (2013.01); *G02F 1/133608* (2013.01)

(58) Field of Classification Search
 CPC .................... G02B 6/0073; G02F 1/133608
 See application file for complete search history.

(56) References Cited

U.S. PATENT DOCUMENTS

2008/0239195 A1  10/2008  Nishio et al.
2012/0140143 A1*  6/2012  Wurzel .................. G02F 1/1333
                                                      349/62

FOREIGN PATENT DOCUMENTS

| CN | 1153913 A | 7/1997 |
| CN | 101276077 A | 10/2008 |
| CN | 102566104 A | 7/2012 |

* cited by examiner

Primary Examiner — Joseph L Williams
(74) Attorney, Agent, or Firm — Dentons US LLP (57) ABSTRACT

A backlight unit for a liquid crystal display (LCD) device is capable of allowing a narrower bezel by reducing a size of a support main in the liquid crystal display (LCD) device. The backlight unit includes the support main in which an alignment hole is formed on at least one side.

15 Claims, 7 Drawing Sheets

BACKLIGHT UNIT AND LIQUID CRYSTAL DISPLAY INCLUDING THE SAME

CROSS-REFERENCE TO RELATED APPLICATION

Pursuant to 35 U.S.C. §119(a), this application claims the benefit of an earlier filing date and right of priority to Korean Application No. 10-2013-0156704, filed on Dec. 16, 2013, the contents of which is incorporated by reference in its entirety for all purposes as if fully set forth herein.

BACKGROUND

1. Field of the Disclosure

The present disclosure relates to a backlight unit, and more particularly, to a backlight unit for a liquid crystal display capable of allowing a narrower bezel by reducing a size of a support main, and a liquid crystal display including the same.

2. Background of the Invention

Recently, liquid crystal displays (LCDs), having advantageous characteristics of being lighter and thinner and driven at lower power, and the like, are more widely used.

An LCD includes a liquid crystal panel and a backlight unit providing light to the liquid crystal panel.

Figure 1:
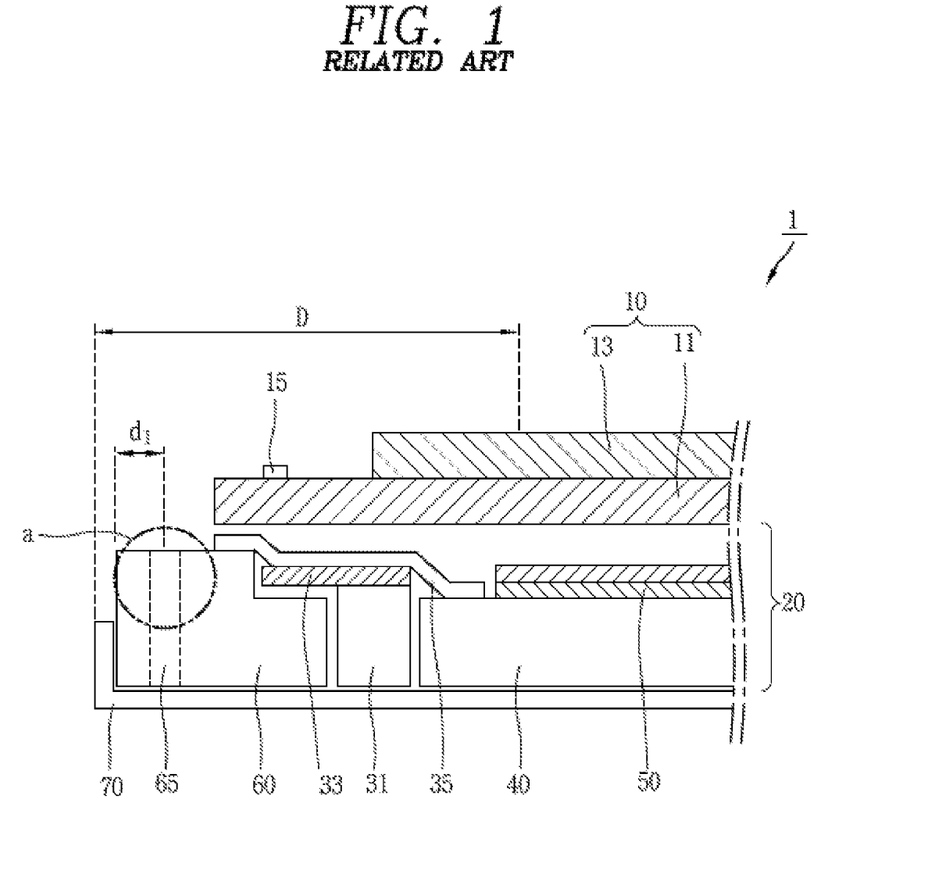
FIG. 1 is a cross-sectional view of the related art liquid crystal display (LCD) device.
Figure 2:
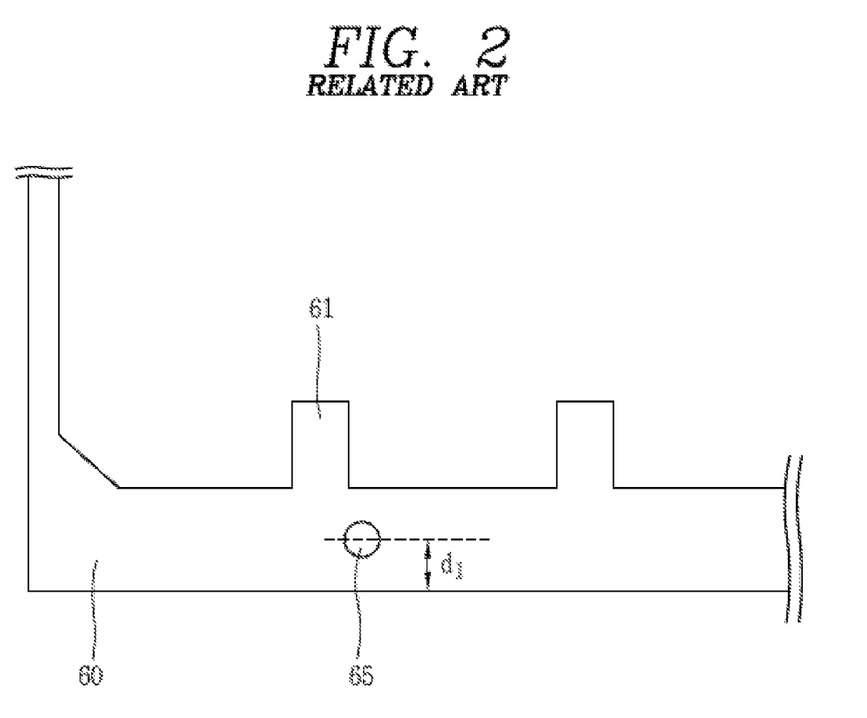
FIG. 2 is an enlarged plan view of a portion 'a' of FIG. 1 according to the related art.

FIG. 1 is a cross-sectional view of a related art LCD and FIG. 2 is an enlarged plan view of a portion "a" in FIG. 1.

Referring to FIGS. 1 and 2, the related art LCD 1 includes a liquid crystal panel 10 and a backlight unit 20.

The liquid crystal panel 10 includes an array substrate 11, a color filter substrate 13, and a liquid crystal layer (not shown) interposed therebetween. A predetermined alignment key 15 is formed on a portion of the array substrate 11 and not covered by the color filter substrate 13. The alignment key 15 may have a cross (+) shape.

The backlight unit 20 is disposed below the liquid crystal panel 10 and provides light to the liquid crystal panel 10. The backlight unit 20 includes a light source 31 and 33, a light guide plate 40, an optical sheet 50, a support main 60, and a bottom cover 70.

The light source 31 and 33 includes a light emitting diode (LED) 31 emitting light and a board, for example, a flexible printed circuit board (FPCB) 33 on which the LED 31 is mounted.

The light guide plate 40 is disposed to be adjacent to one side of the LED 31, for example, to a light emitting unit of the LED 31, and guides light emitted from the LED 31 in a direction toward the liquid crystal panel 10.

The optical sheet 50 is disposed on the light guide plate 40, and diffuses and collects light output from an upper surface of the light guide plate 40 to the liquid crystal panel 10. The optical sheet 50 includes a diffusion sheet and one or more prism sheets.

The light source 31 and 33, the light guide plate 40, and the optical sheet 50 are supported by the support main 60 and the bottom cover 70.

The support main 60 has a quadrangular frame shape. One or more mounting portions 61 allowing the FPCB 33 of the light source 31 and 33 to be mounted thereon and maintaining spaces between the LEDs 31 are formed on one side of support main 60.

An attachment tap 35 is attached to extend from one side of the upper surface of the support main 60 to an upper surface of the board 33 and the light guide plate 40 to fix the light source 31 and 33 and the light guide plate 40.

Also, an alignment hole 65 corresponding to an alignment key 15 of the liquid crystal panel 10 as described above is formed in the support main 60. The alignment hole 65 is aligned with the alignment key 15 of the liquid crystal panel 10 and used to couple the liquid crystal panel 10 and the backlight unit 20.

In other words, the liquid crystal panel 10 and the backlight unit 20 are formed through different processes and automatically assembled to be coupled by using an assembling device (not shown). In this case, an aligning process is required in order to accurately couple the liquid crystal panel 10 and the backlight unit 20. In this case, the alignment key 15 is formed on the liquid crystal panel 10 and the alignment hole 65 is formed on the support main 60 of the backlight unit 20, and the alignment key 15 and the alignment hole 65 are aligned to thereby align and couple the liquid crystal panel 10 and the backlight unit 20.

The alignment hole 65 is formed on one side of the support main 60, for example, in a region where the mounting portion 61 is formed. In this case, in order to accurately form the alignment hole 65 and maintain rigidity of the support main 60, the width of one side of the support main 60 where the alignment hole 65 is formed is increased.

In other words, the alignment hole 65 is formed to be spaced apart from one end of the support main 60 by a predetermined distance d1, and the mounting portion 61 is formed to be spaced from the center of the alignment hole 65 by the distance d1. Accordingly, the width of one side of the support main 60 is increased by the distance d1 of the alignment hole 65, resulting in an increase the size of the support main 60.

In this manner, in the related art LCD device 1, because the width of one side of the support main 60 increases, the width of a bezel region of the LCD device 1, namely, the width D of a non-display region of the LCD device, also increased. The increase in the bezel region results in an increase in the overall size of the LCD device.

SUMMARY

Therefore, an aspect of the detailed description is to provide a backlight unit capable of reducing a bezel region of a liquid crystal display (LCD) device by reducing a size of a support main by changing a position and a shape of an alignment hole formed in the support main, and an LCD device including the same.

To achieve these and other advantages and in accordance with the purpose of this specification, as embodied and broadly described herein, a backlight unit may include a light source including a flexible printed circuit board (FPCB) and a plurality of light emitting diodes (LEDs) mounted on the FPCB; a light guide plate adjacent to the LEDs of the light source; a support main supporting the light source and the light guide plate; an alignment hole on a side of the support main with a center spaced apart by a first distance from a vertex of the support main; and an extending portion extending to an inner side of the support main from the center of the alignment hole by the first distance.

Also, an embodiment further includes a backlight unit comprising: a light source including a flexible printed circuit board (FPCB) and a plurality of light emitting diodes (LEDs) mounted on the FPCB; a light guide plate adjacent to the LEDs of the light source; and a support main supporting the light source and the light guide plate and having an angled corner; an alignment hole on the angled corner having a semicircular shape having a center at an edge of the angled corner.

Further embodied is a liquid crystal display (LCD) device including a liquid crystal panel configured to display an image and having an alignment key on one side; and a backlight unit below the liquid crystal panel and configured to supply light to the liquid crystal panel, wherein the backlight unit comprises: a light source including a flexible printed circuit board (FPCB) and a plurality of light emitting diodes (LEDs) mounted on the FPCB; a light guide plate adjacent to the LEDs; and a support main supporting the light source and the light guide plate and having an alignment hole on a side.

In the backlight unit and the LCD device including the backlight unit according to embodiments of the present disclosure, a size of a support main can be reduced by changing a position and a shape of an alignment hole formed in the support main, and thus, a size of a bezel region of the LCD device can be reduced.

In addition, since the bezel region is reduced, the LCD device having a narrow bezel and a maximized display region can be implemented for the LCD having the same size.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a backlight unit and a liquid crystal display (LCD) device according to embodiments of the present disclosure will be described in detail with reference to the accompanying drawings.

Figure 3:
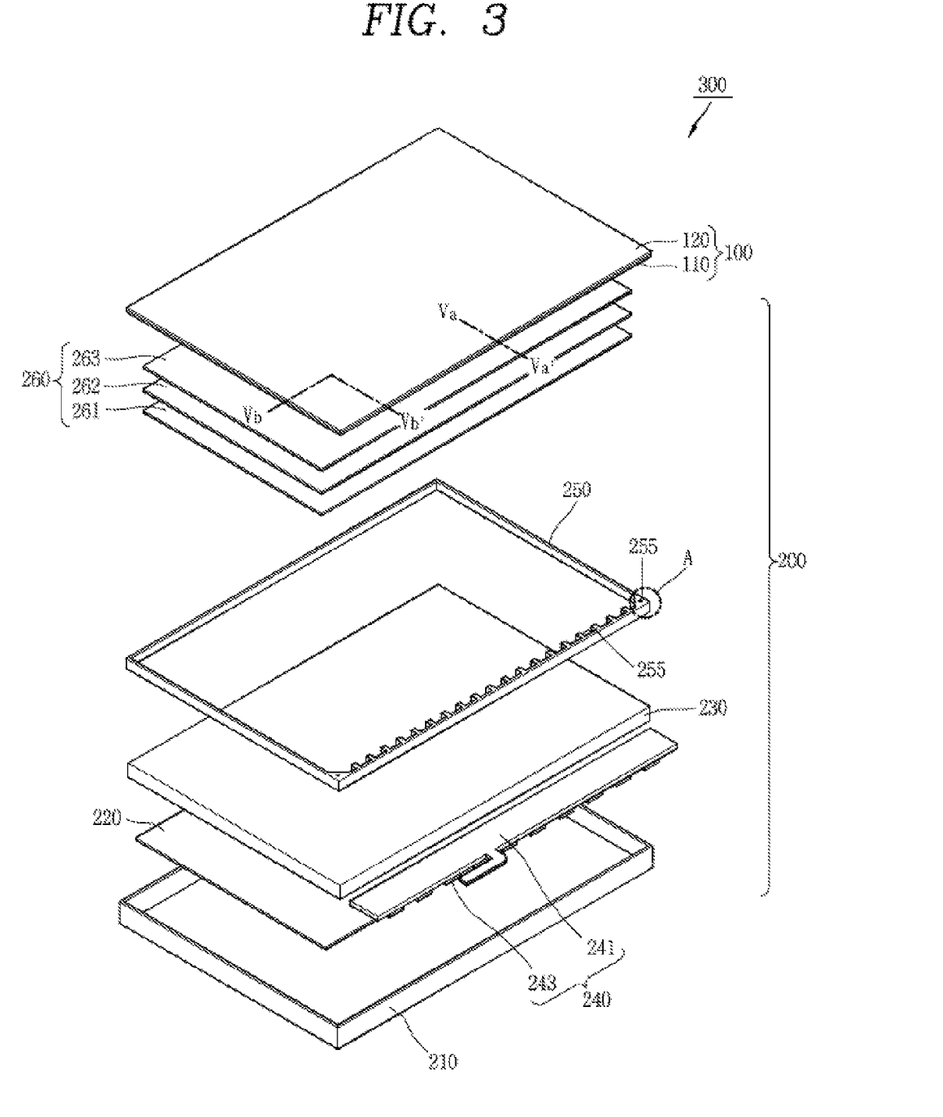
FIG. 3 is an exploded perspective view of an LCD device according to a first exemplary embodiment of the present disclosure.
Figure 4:
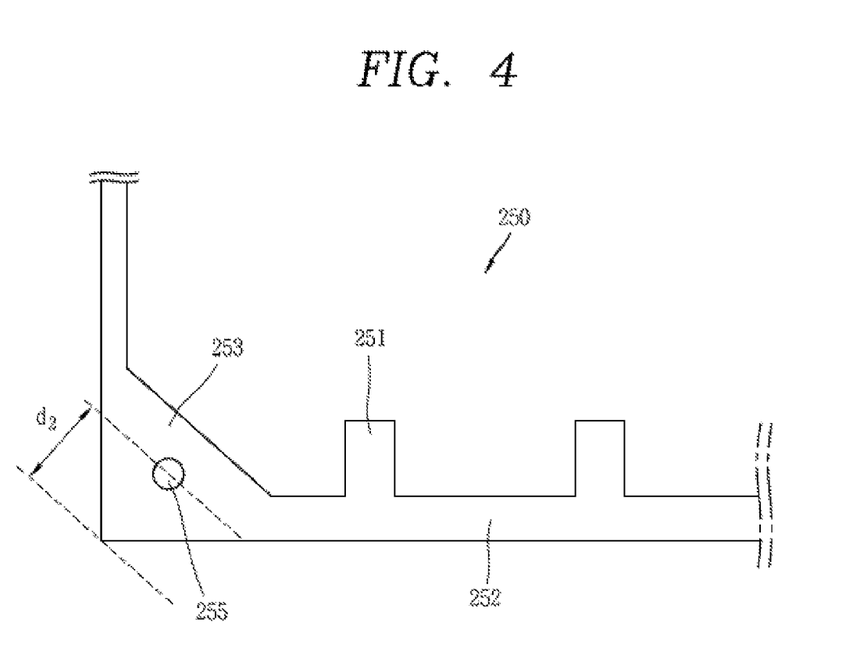
FIG. 4 is an enlarged plan view of a portion 'A' of FIG. 3.

FIG. 3 is an exploded perspective view of an LCD device according to a first exemplary embodiment of the present disclosure, and FIG. 4 is an enlarged plan view of a portion 'A' of FIG. 3.

Figure 5A:
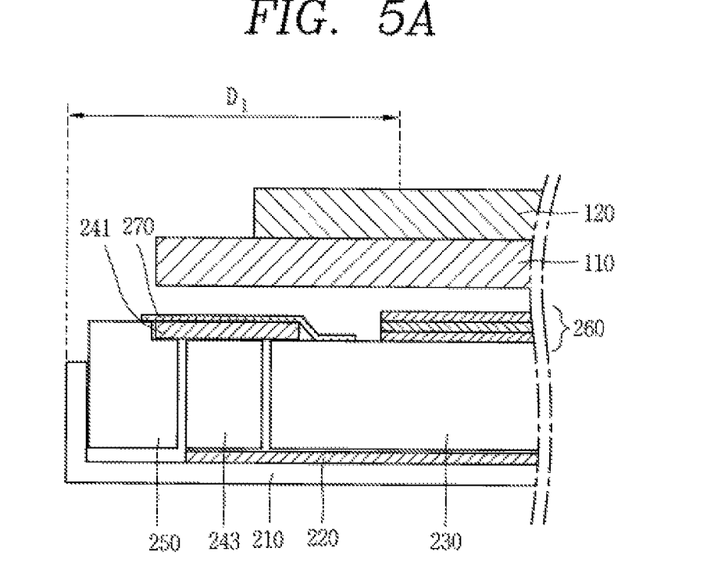
FIG. 5A is a cross-sectional view of the LCD device of FIG. 3 taken along line Va-Va' of FIG. 3.
Figure 5B:
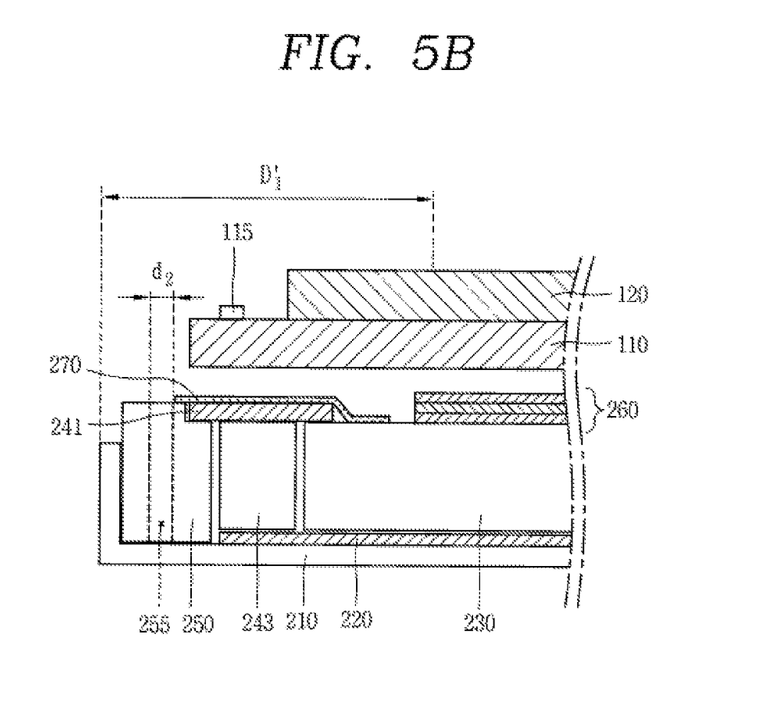
FIG. 5B is a cross-sectional view of the LCD device of FIG. 3 taken along line Vb-Vb' of FIG. 3.

FIG. 5A is a cross-sectional view of the LCD device of FIG. 3 taken along line Va-Va' of FIG. 3, and FIG. 5B is a cross-sectional view of the LCD device of FIG. 3 taken along line Vb-Vb' of FIG. 3.

Referring to FIGS. 3 through 5B, an LCD device 300 according to the present embodiment may include a liquid crystal panel 100 and a backlight unit 200.

The liquid crystal panel 100 displays an image and may include mutually attached array substrate 110 and color filter substrate 120, and a liquid crystal layer (not shown) interposed between the two substrates 110 and 120.

Also, the array substrate 110 may include a plurality of pixels (not shown) defined where a plurality of gate lines (not shown) and a plurality of data lines (not shown) cross, thin film transistors (not shown) formed respectively in the plurality of pixels, and a pixel electrode (not shown).

Also, the color filter substrate 120 may include color filters corresponding to pixels of the array substrate 110 and a black matrix (not shown) disposed in a peripheral region of the color filters. A common electrode (not shown) forming an electric field with the pixel electrode of the array substrate 110 may be disposed in the array substrate 110 or the color filter substrate 120.

The configuration of the array substrate 110 and the color filter substrate 120 may be variously changed according to driving modes of the LCD device 300, for example, a twisted nematic (TN) mode, in-plane switching (IPS) mode, a vertical alignment (VA) mode, a fringe field switching (FFS) mode, and the like.

The liquid crystal panel 100 may further include a gate driving circuit (not shown) and a data driving circuit (not shown) respectively supplying a gate signal and a data signal from the outside. The gate driving circuit and the data driving circuit may be mounted on the liquid crystal panel 100 or may be connected to the liquid crystal panel through a connection member such as a tape carrier package (TCP), or the like.

One or more alignment keys 115 for alignment with the backlight unit 200 may be formed on one side of the array substrate 110, for example, on one side of the array substrate 110 having a size smaller than that of the array substrate 110 and exposed by the color substrate 120. The alignment keys 115 may have a cross (+) shape, but the present disclosure is not limited thereto.

Polarizing plates (not shown) may be disposed on upper and lower surfaces of the liquid crystal panel 110, namely, on outer surfaces of the array substrate 110 and the color filter substrate 120.

The backlight unit 200 may be disposed below the liquid crystal panel 100 to provide light to the liquid crystal panel 100. The backlight unit 200 may include a bottom chassis 210, a light source 240, a light guide plate 230, and a support main 250.

The bottom chassis 210 may have an open upper surface, have a quadrangular shape, and receive the support main 250, the light source 240, and the light guide plate 230 therein. The bottom chassis 210 may be coupled with a top chassis (not shown) to fix the liquid crystal panel 100 and the backlight unit 200 together.

The light source 240 may include a flexible printed circuit board (FPCB) 241 and a plurality of light emitting diodes (LEDs) 243 mounted on the FPCB 241. The light source 240 may be fixed to one side of the support main 250 and disposed on a side wall of the bottom chassis 210. Here, the light source 240 may be disposed such that a light emitting surface of each of the LEDs 243 is adjacent to an incident surface of the light guide plate 230.

The light guide plate 230 may serve to uniformly guide light provided from the light source 240 to the liquid crystal panel 100. The light guide plate 230 may be accommodated within the bottom chassis 210 and disposed to be adjacent to the LEDs 243 of the light source 240.

In the present exemplary embodiment, it is illustrated that the light guide plate 230 has a uniform thickness, but the present disclosure is not limited thereto. For example, the light guide plate 230 may be a wedge type light guide plate formed such that one side thereof adjacent to the light source 240 is thicker and the other remaining regions excluding the one side is thinner.

A reflective sheet 220 may be disposed between the light guide plate 230 and the bottom surface of the bottom chassis 210. The reflective sheet 220 may reflect light, which travels toward the bottom surface of the bottom chassis 210, to the light guide plate 230, thus increasing optical efficiency.

The optical sheet 260 may be disposed on the light guide plate 230. The optical sheet 260 may include a diffusion sheet 261 diffusing light output from the light guide plate 230, a light collecting sheet 262 for collecting light diffused by the diffusion sheet 261, and a protective sheet 263 protecting the light collecting sheet 262.

The support main 250 may be fastened to the bottom chassis 210 to accommodate and support the components of the backlight unit 200, for example, the reflective sheet 220, the light guide plate 230, and the light source 240 therein. The support main 250 may have a quadrangular shape, and upper and lower surfaces thereof are open.

A plurality of mounting portions 251 may be formed on one side wall 252 of the support main 250, for example, on one side wall corresponding to the light source 240 to allow the FPCB 241 of the light source unit 240 to be mounted thereon.

The mounting portions 251 may protrude to extend from the one side wall 252 of the support main 250 to an inner side. The mounting portions 251 may have a predetermined step with respect to the one side wall 252 of the support main 250.

The FPCB 241 of the light source 240 may be supportedly mounted on the mounting portions 251. Also, LEDs 243 of the light source 240 may be supported between adjacent mounting portions 251.

The light source 240 may be fixed to the support main 250 and the light guide plate 230 by an adhesive tape 270 extending from an upper surface of the one side wall 252 of the support main 250 to an upper surface of the light guide plate 230.

Here, the adhesive tape 270 may be attached to extend from the upper surface of the one side wall 252 of the support main 250 to the upper surface of the light guide plate 230 through the FPCB 241 corresponding to the mounting portions 251. Accordingly, since the adhesive tape 270 is not attached to upper surfaces of the LEDs 243 disposed between the adjacent mounting portions 251, optical efficiency in the region can be enhanced.

An alignment hole 255 may be formed in a vertex region on at least one side of the support main 250. The alignment hole 255 may have a circular shape having the center spaced apart from the vertex on one side of the support main 250 by a predetermined distance d2. However, the shape of the alignment hole 255 is not limited thereto and the alignment hole 255 may have various other shapes such as an oval shape, a triangular shape, a quadrangular shape, and the like.

The alignment hole 255 may be aligned with an alignment key 115 of the liquid crystal panel 110 described above during an assembling process of the liquid crystal panel 100 and the backlight unit 200. In other words, after the liquid crystal panel 100 and the backlight unit 200 are completed through separate processes, when a process for assembling the liquid crystal panel 100 and the backlight unit 200, a virtual cross (+) shape may be viewed in the alignment hole 255 of the support main through vision alignment and aligned with the alignment key 115 of the liquid crystal panel 100. In a state in which the liquid crystal panel 100 and the support main 250 are aligned, the liquid crystal panel 100 is mounted above the support main 250 to assemble the liquid crystal panel 100 and the backlight unit 200.

Referring to FIG. 4, a center of the alignment hole 255 may be spaced apart from the vertex at one side of the support main 250 by a predetermined distance, for example, by a first distance d2. The alignment hole 255 may have a circular shape with a predetermined width from the center thereof. Here, a diameter of the alignment hole 255 may be approximately 0.5 mm.

An extending portion 253 may be formed on one side of the support main 250, namely, in the vertex region and extend to an inner side of the support main 250. The extending portion 253 may extend from the center of the alignment hole 255 to the inner side of the support main 250 by a predetermined distance, for example, by a first distance d2. The extending portion 253 may be provided to secure a formation space of the alignment hole 255 formed in the support main 250 and maintain rigidity of the support main 250.

Thus, because the alignment hole 255 is formed on at least one side of the support main 250, as illustrated in FIG. 5B, the width of the side wall region of the support main 250, namely, the one side wall 252 on which the plurality of mounting portions 251 are formed, may be reduced. Accordingly, compared with the related art LCD device, shown in FIG. 1, in the LCD device 300, the size of the main support 250 may be reduced, and thus, a bezel region may have a width D1 smaller than the width D of the bezel region of the related art LCD device.

Meanwhile, referring to FIG. 5B, the width of a lateral portion of the support main 250, namely, a lateral portion where the alignment hole 255 is formed, may not be reduced, in comparison to that of the related art. In other words, since the alignment hole 255 is spaced apart from the vertex of the support main 250 by the first distance d2 and has a circular shape, the extending portion 253 may also need to have a width by the first distance d2 from the center of the alignment hole 255. Thus, the width D1' of the bezel region at the lateral portion of the support main 250 may be equal to the width D of the bezel region of the related art LCD device.

Thus, a method for further reducing the size of the support main 250 is required, and the method will be described with reference to the accompanying drawings.

Figure 6:
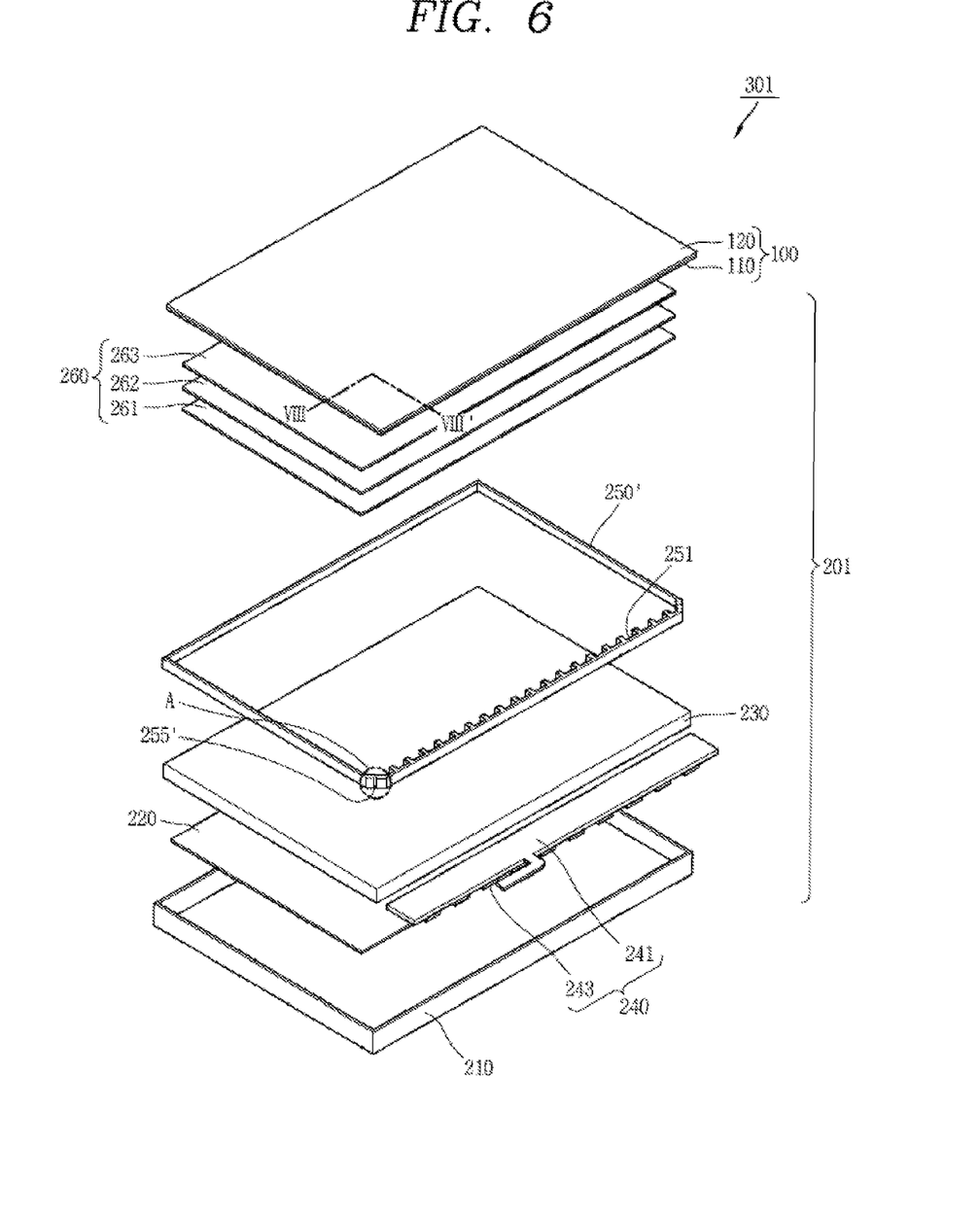
FIG. 6 is an exploded perspective view of an LCD device according to a second exemplary embodiment of the present disclosure.
Figure 7:
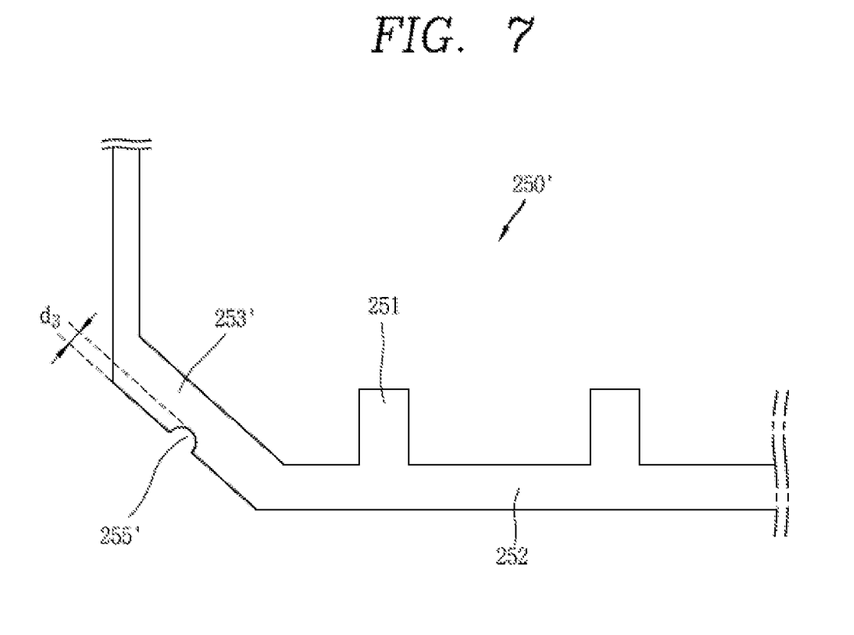
FIG. 7 is an enlarged plan view of a portion 'A' of FIG. 6.
Figure 8:
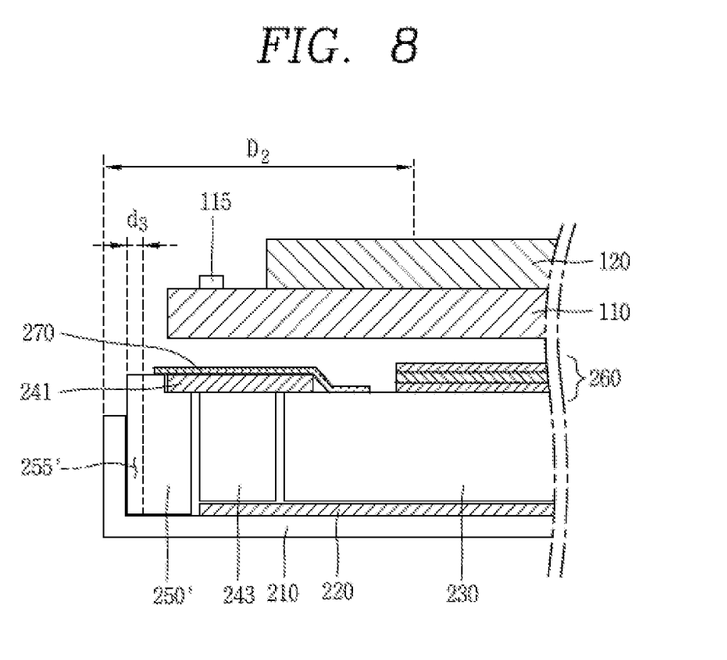
FIG. 8 is a cross-sectional view taken along line VIII-VIII' of FIG. 6.

FIG. 6 is an exploded perspective view of an LCD device according to a second exemplary embodiment of the present disclosure, FIG. 7 is an enlarged plan view of a portion 'A' of FIG. 6, and FIG. 8 is a cross-sectional view taken along line VIII-VIII' of FIG. 6.

Here, the LCD device according to the second embodiment has the same components as those of the LCD device according to the first embodiment, except for changed shapes of the support main and the alignment holes. Thus, the same components will be indicated by the same reference numerals and a detailed description thereof will be omitted.

Referring to FIGS. 6, 7, and 8, an LCD device 301 according to the present exemplary embodiment may include a liquid crystal panel 100 and a backlight unit 201.

The backlight unit 201 may be disposed below the liquid crystal panel 100 to provide light to the liquid crystal panel 100. The backlight unit 201 may include a bottom chassis 210, a light source 240, a light guide plate 230, and a support main 250'.

The bottom chassis 210 may have an open upper surface, have a quadrangular shape, and receive the support main 250', the light source 240, and the light guide plate 230 therein.

The light source 240 may include a flexible printed circuit board (FPCB) 241 and a plurality of light emitting diodes (LEDs) 243 mounted on the FPCB 241. The light source 240 may be fixed to one side of the support main 250' and disposed on a side wall of the bottom chassis 210. Here, the light source 240 may be disposed such that a light emitting surface of each of the LEDs 243 is adjacent to an incident surface of the light guide plate 230.

The support main 250' may be fastened to the bottom chassis 210 to support the components of the backlight unit 201, for example, the reflective sheet 220, the light guide plate 230, and the light source 240 therein. The support main 250' may have a quadrangular shape, and upper and lower surfaces thereof are open.

A plurality of mounting portions 251 may be formed on one side wall of the support main 250', for example, on one side wall corresponding to the light source 240 to allow the FPCB 241 of the light source 240 to be mounted thereon.

The mounting portions 251 may protrude to extend from the one side wall 252 of the support main 250' to an inner side. The mounting portions 251 may have a predetermined step with respect to the one side wall 252 of the support main 250'.

The FPCB 241 of the light source 240 may be supportedly mounted on the mounting portions 251. Also, LEDs 243 of the light source 240 may be supportedly disposed between adjacent mounting portions 251.

The light source 240 may be fixed to the support main 250' and the light guide plate 230 by an adhesive tape 270 extending from an upper surface of the one side wall 252 of the support main 250' to an upper surface of the light guide plate 230.

At least one side of the support main 250' may be sloped. For example, the support main 250' may have at least two vertex regions formed as sloped surfaces, rather than having a rectangular shape with four vertices. The sloped surfaces may be formed on both sides of one side wall 252 of the support main 250' where the mounting portions 251 are formed.

An alignment hole 255' may be formed on an end of the sloped surface of the support main 250'. The alignment hole 255' may have a semicircular shape and be centered on the sloped surface.

The alignment hole 255' may be aligned with an alignment key 115 of the liquid crystal panel 110 described above during an assembling process of the liquid crystal panel 100 and the backlight unit 201. In other words, after the liquid crystal panel 100 and the backlight unit 201 are completed through separate processes, when a process for assembling the liquid crystal panel 100 and the backlight unit 201, a virtual cross (+) shape may be viewed in the alignment hole 255' of the support main through vision alignment and aligned with the alignment key 115 of the liquid crystal panel 100. In a state in which the liquid crystal panel 100 and the support main 250' are aligned, the liquid crystal panel 100 is mounted above the support main 250' to assemble the liquid crystal panel 100 and the backlight unit 201.

Referring to FIG. 7, the alignment hole 255' may have a semicircular shape with a predetermined width d3, namely, a predetermined radius for a circular hole, at the end of the sloped surface of the support main 250'. Here, a diameter of the alignment hole 255' may be approximately 0.25 mm.

Accordingly, an extending portion 253' may be formed to extend to the inner side of the support main 250' at one side of the support main 250', namely, in the region where the sloped surface is formed. The extending portion 253' may extend from an outer circumferential surface of the alignment hole 255' to the inner side of the support main 250' by a radius of the alignment hole 255'.

Namely, at least one side of the support main 250' of the present exemplary embodiment is formed to be sloped and the semicircular alignment hole 255' is formed at an edge of the sloped surface, whereby the extending portion 253' extending to the inner side of the support main 250' due to the alignment hole 255' may be formed to have a width d3 of the alignment hole 255', namely, have a width equal to the radius of the alignment hole 255'. Thus, the support main 250' according to the present embodiment may be reduced in size, in comparison to that of the related art.

In this manner, because the semicircular alignment hole 255' is formed at an edge of at least one sloped surface of the support main 250', the size of the support main 250' may be reduced as illustrated in FIG. 8. Accordingly, the LCD device 301 according to the present embodiment may implement the bezel region having a width D2 smaller than the width D of the bezel region of the related art LCD device.

In addition, since the extending portion 253' of the support main 250' is formed to have a small width, a width of each of the mounting portions 251 may be maximized, and thus, separation of the adhesive tape 270 when the FPCB 241 of the light source 240 is fixed to the mounting portions 251 can be prevented, securing assembling reliability.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A backlight unit comprising:
    a light source including a flexible printed circuit board (FPCB) and a plurality of light emitting diodes (LEDs) mounted on the FPCB;
    a light guide plate adjacent to the LEDs of the light source;
    a support main with upper and lower surfaces open and supporting the light source and the light guide plate;
    an alignment hole on a side of the support main with a center spaced apart by a first distance from a vertex of the support main; and
    an extending portion extending to an inner side of the support main from the center of the alignment hole by the first distance.

2. The backlight unit of claim 1, wherein the alignment hole has a circular shape.

3. The backlight unit of claim 1, wherein the support main includes a plurality of mounting portions on a side wall, the FPCB of the light source is mounted on the plurality of mounting portions, and the plurality of LEDs are mounted in spaces between adjacent mounting portions.

4. The backlight unit of claim 3, further comprising an adhesive tape attached to an upper portion of a side wall of the support main, over the FPCB, and to an upper surface of the light guide plate.

5. A backlight unit comprising:
    a light source including a flexible printed circuit board (FPCB) and a plurality of light emitting diodes (LEDs) mounted on the FPCB;
    a light guide plate adjacent to the LEDs of the light source;
    a support main with upper and lower surfaces open and supporting the light source and the light guide plate and having an angled corner; and
    an alignment hole on the angled corner having a semicircular shape having a center at an edge of the angled corner.

6. The backlight unit of claim 5, wherein the support main has an extending portion extending to an inner side of the support main from a point of the alignment hole by a radius of the alignment hole.

7. The backlight unit of claim 5, wherein the support main includes a plurality of mounting portions on a side wall, the FPCB of the light source is mounted on the plurality of mounting portions, and the plurality of LEDs are mounted in spaces between adjacent mounting portions.

8. The backlight unit of claim 5, further comprising an adhesive tape attached to an upper portion of a side wall of the support main, over the FPCB, and to an upper surface of the light guide plate.

9. A liquid crystal display (LCD) device comprising:
    a liquid crystal panel to display an image and having an alignment key on one side; and
    a backlight unit below the liquid crystal panel and to supply light to the liquid crystal panel,
    wherein the backlight unit comprises:
        a light source including a flexible printed circuit board (FPCB) and a plurality of light emitting diodes (LEDs) mounted on the FPCB;
        a light guide plate adjacent to the LEDs; and
        a support main with upper and lower surfaces open and supporting the light source and the light guide plate and having an alignment hole on a side,
    wherein the support main has an extending portion extending to an inner side of the support main from the alignment hole.

10. The LCD device of claim 9, wherein the alignment hole has a circular shape with a center spaced apart from one vertex of the support main by a first distance.

11. The LCD device of claim 10, wherein the extending portion extends to the inner side of the support main from the center of the alignment hole by the first distance.

12. The LCD device of claim 9, wherein a side of the support main has a sloped surface, and the alignment hole has a semicircular shape having a center at an edge of the sloped surface.

13. The LCD device of claim 12, wherein the extending portion extends to the inner side of the support main from the edge portion of the alignment hole by a radius of the alignment hole.

14. The LCD device of claim 9, wherein the support main includes a plurality of mounting portions on a side wall, the FPCB of the light source is mounted on the plurality of mounting portions, and the LEDs are mounted in spaces between adjacent mounting portions.

15. The LCD device of claim 14, further comprising: an adhesive tape attached to an upper portion of a side wall of the support main, over the FPCB, and to an upper surface of the light guide plate corresponding to the mounting portions.

* * * * *